(12) United States Patent
Tardif

(10) Patent No.: US 11,190,505 B2
(45) Date of Patent: Nov. 30, 2021

(54) PASSWORD CARD HINTING SYSTEM

(71) Applicant: Patrick Tardif, Elk Grove, CA (US)

(72) Inventor: Patrick Tardif, Elk Grove, CA (US)

(73) Assignee: Patrick Tardif, Elk Grove, CA (US)

( * ) Notice: Subject to any disclaimer, the term of this patent is extended or adjusted under 35 U.S.C. 154(b) by 359 days.

(21) Appl. No.: 15/207,960

(22) Filed: Jul. 12, 2016

(65) Prior Publication Data

US 2018/0018455 A1   Jan. 18, 2018

(51) Int. Cl.
*H04L 29/06* (2006.01)
*G06F 21/46* (2013.01)
*G06F 21/35* (2013.01)

(52) U.S. Cl.
CPC .......... *H04L 63/0853* (2013.01); *G06F 21/35* (2013.01); *G06F 21/46* (2013.01); *H04L 63/083* (2013.01); *H04L 63/102* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 5,425,102 A * | 6/1995 | Moy | ............... | G06F 21/31 713/165 |
| 5,787,169 A * | 7/1998 | Eldridge | ............... | G06F 21/40 380/286 |
| 6,571,336 B1 * | 5/2003 | Smith, Jr. | ............... | G06F 21/46 380/44 |
| 8,375,428 B2 * | 2/2013 | Won | ............... | G09C 1/00 713/182 |
| 8,453,221 B2 * | 5/2013 | Danielsen | ............... | G09C 1/00 713/155 |
| 9,053,294 B2 * | 6/2015 | Burkill | ............... | G06F 21/36 |
| 9,117,068 B1 * | 8/2015 | Zhang | ............... | G06F 21/36 |
| 9,648,011 B1 * | 5/2017 | Mattsson | ............... | H04L 63/083 |
| 9,813,411 B2 * | 11/2017 | Thibadeau, Sr. | ... | H04L 63/0807 |
| 10,120,995 B2 * | 11/2018 | Sawant | ............... | G06F 21/36 |
| 2005/0027990 A1 * | 2/2005 | Ogawa | ............... | G06F 21/35 713/184 |
| 2005/0044425 A1 * | 2/2005 | Hypponen | ............... | G06F 21/36 726/19 |
| 2005/0114673 A1 * | 5/2005 | Raikar | ............... | G06F 21/46 713/182 |
| 2005/0160297 A1 * | 7/2005 | Ogawa | ............... | G06F 21/31 726/19 |

(Continued)

OTHER PUBLICATIONS

GridID (available at www.deepnetsecurity.com/authenticators/one-time-password/gridid/) (published in SC Magazine in 2012) (obtained Feb. 8, 2019).*

(Continued)

*Primary Examiner* — Sharon S Lynch

(57) ABSTRACT

A method and apparatus for creating and using a password card and a password hint. The invention allows the user to avoid revealing their password and because of that, the invention provides a better secure way of managing passwords. The user is still able to retrieve their password using the password hint and the password card generated by the system. The invention also allow to encrypt and decrypt the password hint to an external API and this add an extra layer of security protection.

8 Claims, 7 Drawing Sheets

| | A | B | C | D | E | F | G | H | I | J | K | L | M | N | O |
|---|---|---|---|---|---|---|---|---|---|---|---|---|---|---|---|
| 1 | x | w | r | 1 | p | @ | w | r | n | p | x | w | r | $ | p |
| 2 | 3 | 8 | G | 4 | d | u | p | 6 | 4 | d | u | p | 6 | P | d |
| 3 | Q | 7 | l | 3 | j | ! | 7 | l | 3 | ; | V | 7 | l | 3 | @ |
| 4 | # | % | h | r | E | s | % | r | E | E | # | % | h | r | E | height $y_1$ to $y_2$ width $x_1$ to $x_2$

(56) References Cited

U.S. PATENT DOCUMENTS

| | | | | |
|---|---|---|---|---|
| 2006/0047969 A1* | 3/2006 | Goertzen | ............... | G06F 21/31 713/185 |
| 2007/0011738 A1* | 1/2007 | Doss | ............... | G06F 21/36 726/18 |
| 2007/0130618 A1* | 6/2007 | Chen | ............... | G06F 21/36 726/8 |
| 2008/0098464 A1* | 4/2008 | Mizrah | ............... | G06F 21/36 726/5 |
| 2009/0271866 A1* | 10/2009 | Liske | ............... | G06F 21/53 726/23 |
| 2010/0024022 A1* | 1/2010 | Wells | ............... | H04L 63/0838 726/7 |
| 2010/0043062 A1* | 2/2010 | Alexander | ............... | G06F 21/36 726/6 |
| 2011/0004928 A1* | 1/2011 | Won | ............... | G06F 21/36 726/7 |
| 2011/0010763 A1* | 1/2011 | Beardslee | ............... | G06F 21/34 726/6 |
| 2011/0191592 A1* | 8/2011 | Goertzen | ............... | G06F 21/36 713/182 |
| 2011/0311042 A1* | 12/2011 | Cheddad | ............... | G06F 21/64 380/28 |
| 2012/0102551 A1* | 4/2012 | Bidare | ............... | G06F 21/36 726/4 |
| 2012/0137352 A1* | 5/2012 | Smales | ............... | G06F 21/31 726/7 |
| 2012/0198530 A1* | 8/2012 | Bodavula | ............... | G06F 21/31 726/6 |
| 2013/0133053 A1* | 5/2013 | Akunuru | ............... | G06F 21/36 726/7 |
| 2013/0198527 A1* | 8/2013 | Lu | ............... | G06F 9/445 713/189 |
| 2013/0318597 A1* | 11/2013 | Parsons | ............... | G06F 21/31 726/19 |
| 2014/0068754 A1* | 3/2014 | Burkill | ............... | G06F 21/36 726/18 |
| 2014/0289870 A1* | 9/2014 | Selander | ............... | G06F 21/46 726/28 |
| 2015/0286816 A1* | 10/2015 | Adler | ............... | G06F 21/45 726/6 |
| 2015/0349960 A1* | 12/2015 | Bagley | ............... | H04L 9/3228 713/168 |
| 2016/0050198 A1* | 2/2016 | Thibadeau, Sr. | ... | H04L 63/0807 726/6 |
| 2016/0210621 A1* | 7/2016 | Khan | ............... | H04L 9/00 |
| 2016/0323314 A1* | 11/2016 | Reddington | ............... | H04L 63/1416 |
| 2017/0353467 A1* | 12/2017 | Anderson | ............... | H04L 63/1425 |
| 2018/0151034 A1* | 5/2018 | Eddins | ............... | H05B 37/0227 |

OTHER PUBLICATIONS

Search Query Report from IP.com (performed Jul. 22, 2020) (Year: 2020).*

\* cited by examiner

|   | A | B | C | D | E | F | G | H | I | J | K | L | M | N | O |
|---|---|---|---|---|---|---|---|---|---|---|---|---|---|---|---|
| 1 | x | w | r | 1 | p | @ | w | r | n | p | x | w | r | $ | p |
| 2 | 3 | 8 | G | 4 | d | u | p | 6 | 4 | d | u | p | 6 | P | d |
| 3 | Q | 7 | 1 | 3 | j | ! | 7 | 1 | 3 | ; | V | 7 | 1 | 3 | @ |
| 4 | # | % | h | r | E | s | % | r | E | E | # | % | h | r | E | height $y_1$ to $y_2$ width $x_1$ to $x_2$

FIG 1

PASSWORD CARD HINTING SYSTEM

FIELD OF THE INVENTION

The present invention relates to systems and methods for recording and retrieving a password card and/or password hint.

BACKGROUND OF THE INVENTION

There is a growing securities need in the world of computerized systems to require strong passwords by users accessing those systems and compatible with their passwords' requirements. A method or tool for generating strong passwords compatible with such systems increases security but also increases their complexity and therefore the difficulty for users to remember and maintain complex passwords. One of the benefits of this invention is to help people remember their passwords—no matter the length and the complexity—with minimum effort required by the end user.

In the field of security, existing password retrieval and management systems require the user to reveal their passwords in order to store and retrieve them, and by doing so it forces the user to trust the provider of such systems. This invention allows the user to bypass this requirement as the passwords are not recorded,. which provides a separation of concern between the user's password and how to retrieve it, which increases security and trust.

In the world of computers, a password retrieval and management system can be compromised, and in some cases, if the user's password is recorded in such a system, the password could be generated by the attackers if they are able to find the encryption key, assuming that those passwords are encrypted. Using this invention, even if those attackers are able to decrypt the user's hint, they will not be able to generate the user's passwords, other than through using brute force. They will need also to decrypt and retrieve the user's password card that is associated with the user's hint. Even if they have both the user's hint and the user's system generated password card, it's not obvious how to generate the user's password, and therefore this invention provides a method that is more secure to existing systems.

BRIEF SUMMARY OF THE INVENTION

In summary, the Password Cards Hint System of the present invention provides the user a better way to manage their passwords. The invention provides methods that provide a better, more secure way to generate strong passwords by using a password card, and the method to retrieve their password using a password hint. The invention provides methods to generate strong passwords automatically based on pre-defined password requirements using the password card and methods to automatically generate a password hint.

BRIEF DESCRIPTION

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 1 is a password card of x width and y height and that contains a plurality of characters.

DETAILED DESCRIPTION OF THE INVENTION

There are many computerized systems that require passwords today, and that number is increasing. The requirements of having strong passwords is also increasing in such systems, because the techniques required to break those passwords is are improving due to many factors including the increase of processing power.

The user must be able to remember those strong passwords, but this is becoming more difficult to do. The user could record those passwords in more vulnerable places that are more accessible to thieves. The user could also be tempted to generate those passwords using common words and/or phrases, making them easier to guess.

Figure 2:
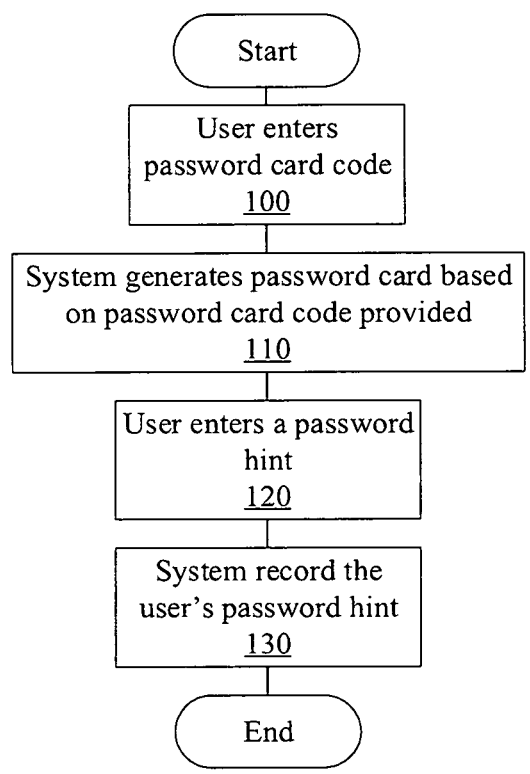
FIG. 2 is a flow diagram illustrating a general method for operation on how the user's password hint is recorded.

The system, by providing a combination of a password card and a password hint, increases security because the user can generate a strong password using the password card provided, and the user can easily figure out what that password is by using the password hint. For example, using the password card in FIG. 1, a user could decide that the password will be the first row and all the characters in that row. Using that example, the user's password will then be xwrlp@wrnpxwr$p. This password is considered a strong password by many embodiments, but is not easy to remember by the user. In that same example, the user can decide to record the hint to be "row 1". Later, when the user is then presented with that password card along with that password hint, he can figure out what the password is In order to use the password card, a user provides initial information on the requirements to generate it. In FIG. 2, the user enters a password card code (100) which is a plurality of characters. Using that password card code, the system generates the password card using a hash algorithm (110). The password card is a matrix x by y of plurality of characters, where x represents a plurality of columns and y represents a plurality of rows. The user then sees the password card that was generated, and enters a password hint (120) to be recorded into the system (130).

Figure 3:
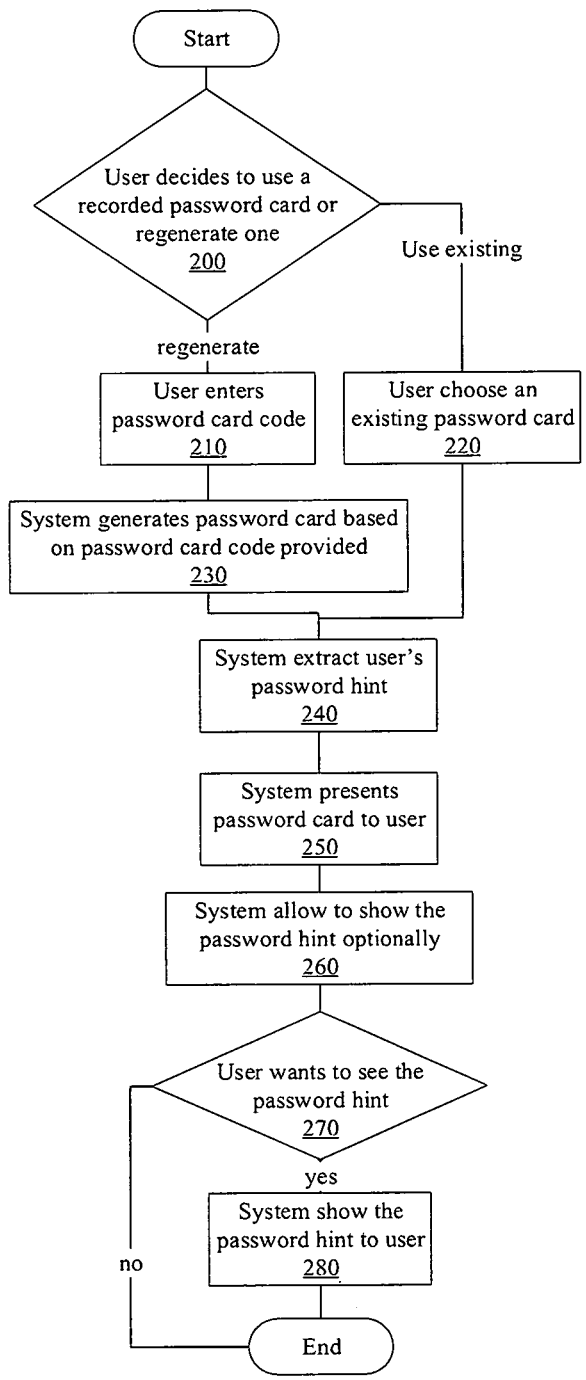
FIG. 3 is a flow diagram illustrating a general method for operation on how the user's recorded password hint is retrieved and shown as text.

In order for the user to retrieve the password, the user must see the password card along with the password hint. As shown in FIG. 3, the user has the option (200) to pick a recorded password card (220) or generate one from a password card code (210) (230). The system shows te the user the password card (250) and provides an option (260) to show or hide the password hint after retrieving it (240). The reason for not displaying the password hint is to increase security. In some environments, people might look over the user's shoulder and by allowing the user to decide when to display the password hint the system is then more secure. If the user decides to allow the system to show the password hint (270), the system then displays it (280).

Figure 4:
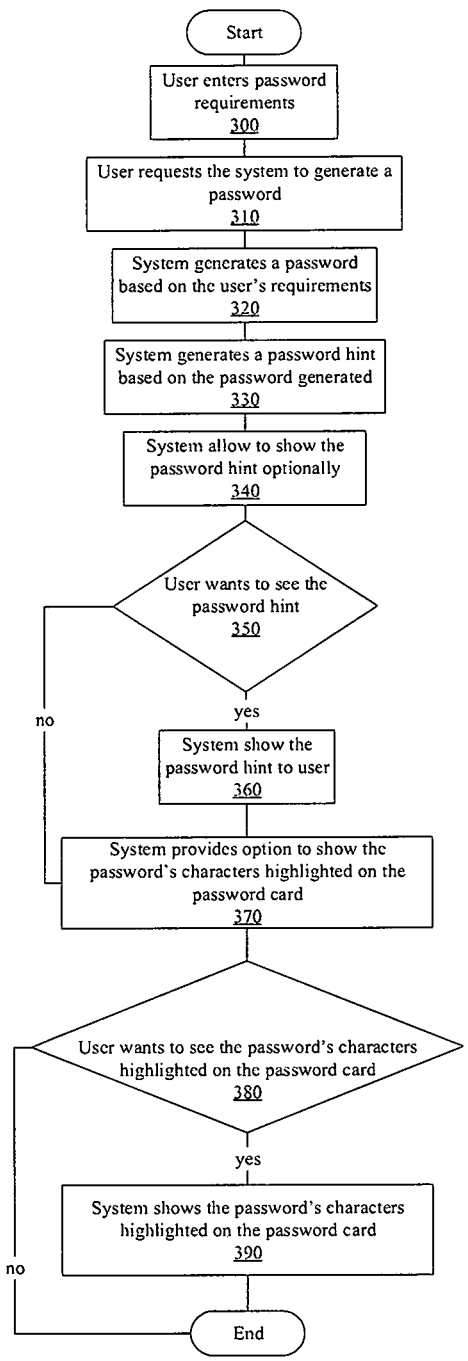
FIG. 4 is a flow diagram illustrating a general method for operation on how the user's recorded password hint is retrieved and shown graphically on the password card.
Figure 5:
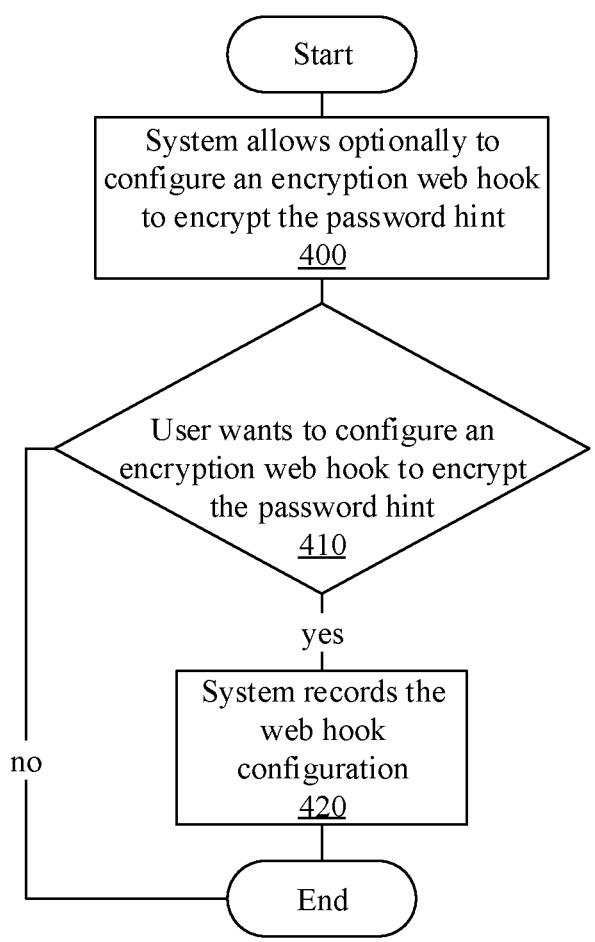
FIG. 5 is a flow diagram illustrating a general method for operation on how an external system to encrypt and decrypt a password hint is configured.
Figure 6:
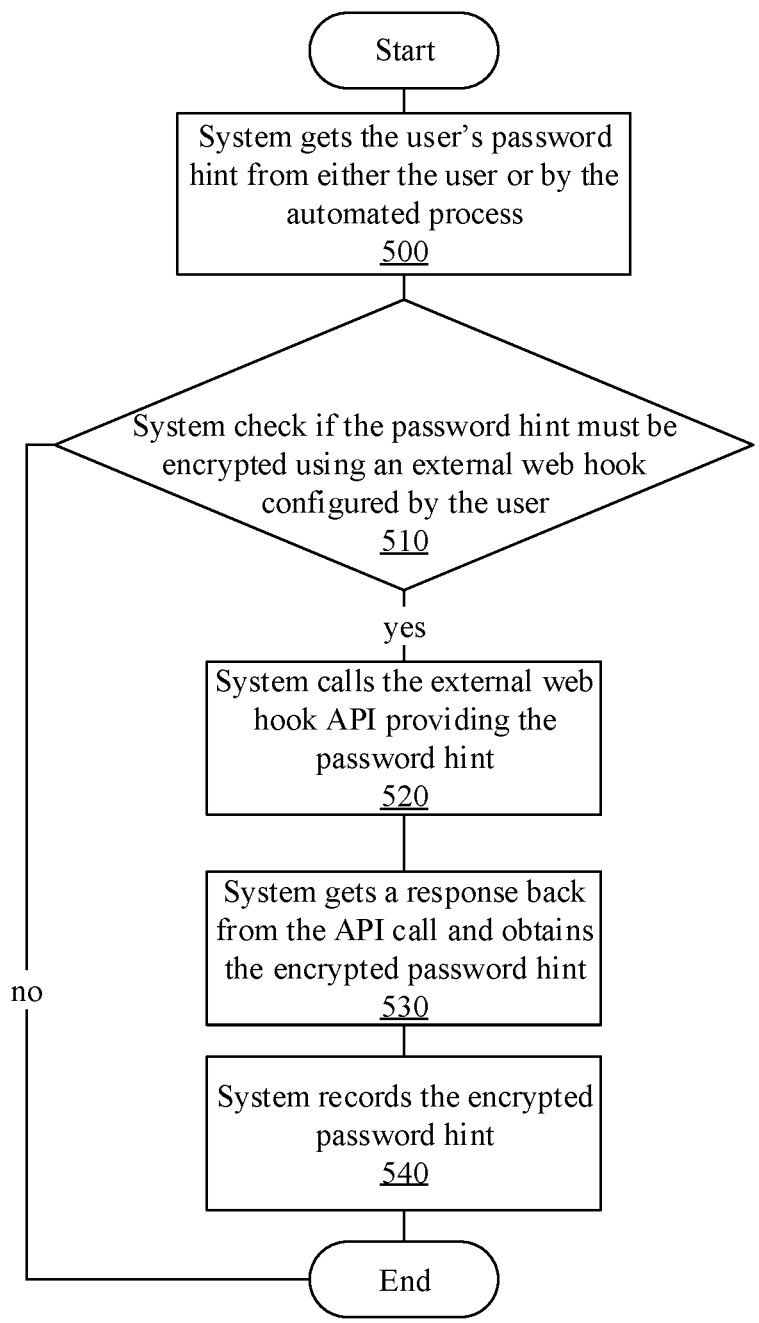
FIG. 6 is a flow diagram illustrating a general method for operation on how a user's password hint is encrypted by an external system.
Figure 7:
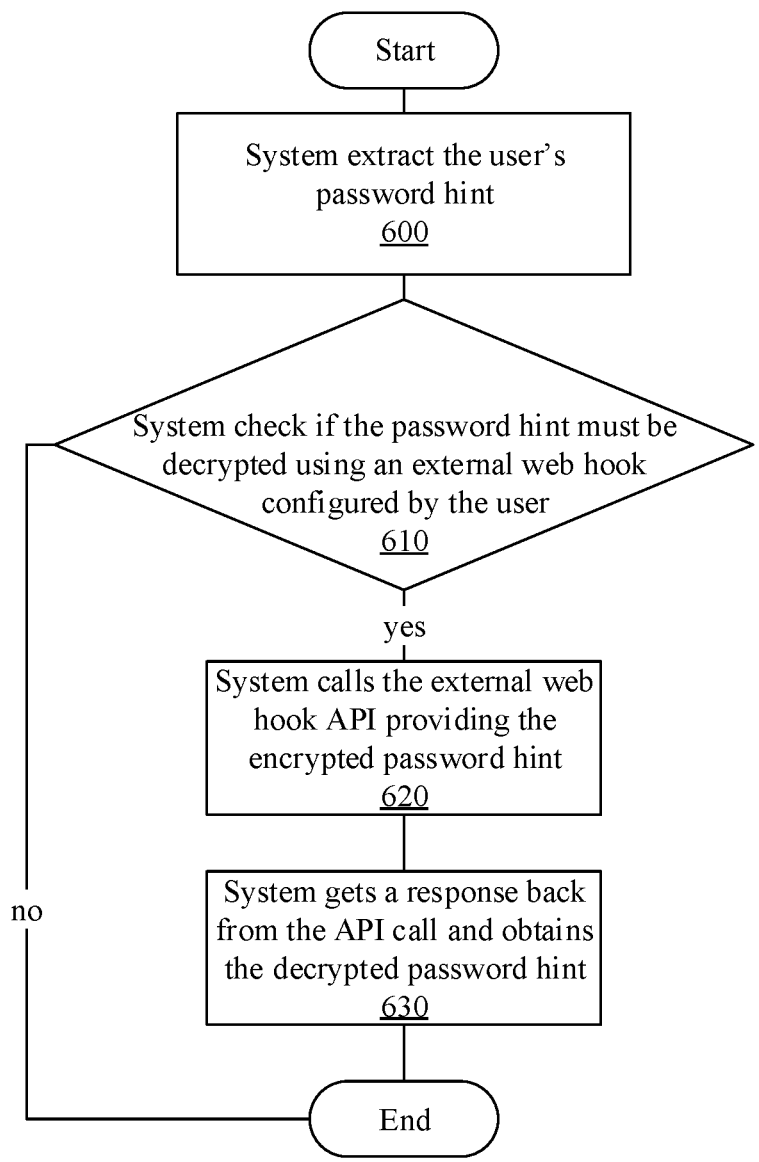
FIG. 7 is a flow diagram illustrating a general method for operation on how a user's password hint is decrypted by an external system.

The user is able to define a password hint by looking at the password card and by doing so, the operation is not fully automated because the user is responsible to come up with the password and the hint. Furthermore, even if the user can generate a strong password,it does not mean it will fulfill the requirements of some embodiments. Many embodiments require specific type of characters to compose a password to force the user to come up with a strong password. For example, some embodiments might require one character to be upper case, contain one numeric character and/or one symbol such as (e.g. !<>@). The system, in order to simplify this operation, provides steps to automate the generation of the password and the password hint to fulfill the requirements of those embodiments. As shown in the FIG. 4, the user provides the requirements of an embodiment,. such as the type of characters required, and the minimum and maximum length of the password to be generated (300). After those requirements have been provided to the system, a user is then able to request the generation (310) of a password by the system (320). After the password is generated by the system, the password hint is also generated (330). The coordinates of each character's position in the generated password and password hint are not known by the user prior to the request. The password generated by the system meets the password requirements, and therefore increases the user experience and reduces the number of trial and error attempts a user might have to do by selecting the characters manually. The hint generated is in the form of positions within the password card. For example, using the password card shown at FIG. 1, if the password is the entire first row starting from the left to the right, the password is going to be (xwrlp@wrnpxwr$p) and the password hint will be (A1-O1) where the characters A and O are the characters representing the columns of the password card and the number 1, the row number. The hint A1-O1 means that the password starts at column 1, row 1 and ends at column O, row 1 by selecting all the characters in between, inclusive of A1 and O1. After the generation of the password hint, the system optionally allows the user to show the hint (350). If the user decides to see it, the system displays it to the user (360). The system provides the user the option of showing the password highlighted on the password card (370). If the user decides to view the highlighted password, the password card characters representing the password are highlighted on the password card (390). This is to allow an easy presentation to the user of what the password looks like when using the password card. It's easier for the user to remember a line selected on the password card than the characters themselves, for example.

The invention claimed is:

1. A method of generating a user password using a password card, wherein the method comprises the following steps performed by a computer system:
receiving, by the computer system, a password card code from a user;
generating, by the computer system, the password card by applying a hash algorithm to the password card code provided by the user,
wherein the password card comprises a visual grid comprising a plurality of columns and rows of cells with each cell of the grid comprising one or more characters;
sending the password card to be displayed upon a user device for the user;
displaying the generated password card, by the computer system, on the user device;
wherein coordinates of the one or more characters on the password card are identical when the hash algorithm uses the same password card code, and are different when the hash algorithm uses a different password card code;
retrieving an encrypted recorded password hint and decrypting the recorded password hint;
displaying, by the computer system, the decrypted password hint on the user device, wherein the decrypted password hint describes coordinates of characters of the user password on the password card; and
generating, using the password card and the decrypted password hint, the user password and displaying the user password on the user device.

2. The method of claim 1, further comprising:
providing, by the computer system, the user with a highlighting option and a de-highlighting option on the user device;
highlighting, by the computer system, one or more characters of the password displayed on the password card when the user selects the highlighting option, and de-highlighting the one or more characters of the password displayed on the password card when the user selects the de-highlighting option.

3. The method of claim 1, comprising:
wherein generating the encrypted recorded password hint comprises:
retrieving, by the computer system, recorded specific password requirements for the user password, by the computer system, from the user;
generating, by the computer system, a password hint; and
encrypting, by the computer system, the password hint and recording the password hint.

4. The method of claim 3, further comprising:
displaying, by the computer system, the generated password hint, by the computer system, on the user device when the user selects an option to display the password hint.

5. An apparatus for generating a user password using a password card, comprising:
a password card code which is received by a user and composed of a plurality of characters,
a hash algorithm, and
a computer processing system comprising a processor coupled to memory that, when executed, will perform the following:
generate the password card stored in the memory of the computer processing system using the password card code and the hash algorithm ;
wherein the password card comprises a visual grid comprising a plurality of columns and rows of cells with each cell of the grid comprising one or more characters;
send the password card to be displayed upon a user device for the user;
display the generated password card on a screen of the user device;
wherein coordinates of the one or more characters on the password card are identical when the hash algorithm uses the same password card code, and are different when the hash algorithm uses a different password card code;
retrieve an encrypted recorded password hint and decrypting the recorded password hint;

display the decrypted password hint on the user device, wherein the decrypted password hint describes coordinates of characters of the user password on the password card; and generate, using the password card and the decrypted password hint, the user password and displaying the user password on the user device.

6. The apparatus of claim 5, wherein generating the encrypted recorded password hint comprises performing the following by the computer processing system:

retrieving password requirements for the user stored in the processing system memory;

generating a password hint;

encrypting the password hint and recording the password hint; and displaying the generated password hint, by the computer system, on the user device when the user selects an option to display the password hint.

7. The apparatus of claim 6, further comprising:

displaying a highlighting option and a de-highlighting option selectable by the user on a screen of the user device, wherein characters representing the user password on the password card are highlighted when the highlight option is selected by the user and highlighted characters representing the password on the password card are de-highlighted when the de-highlighting option is selected by the user.

8. A computer program comprising computer-executable instructions for storage on a non-transitory computer readable medium that, when executed by a processor, cause a computer system to generate a user password using a_password card by performing the following, comprising:

receiving, by the computer system, a password card code from a user;

generating, by the computer system, the password card by applying a hash algorithm to the password card code provided by the user, wherein the password card comprises a visual grid comprising a plurality of columns and rows of cells with each cell of the grid comprising one or more characters;

sending the password card to be displayed upon a user device for the user;

displaying the generated password card, by the computer system, on the user device;

wherein coordinates of the one or more characters on the password card are identical when the hash algorithm uses the same password card code, and are different when the hash algorithm uses a different password card code;

retrieving an encrypted recorded password hint and decrypting the recorded password hint;

displaying, by the computer system, the decrypted password hint on the user device, wherein the decrypted password hint describes coordinates of characters of the user password on the password card; and generating, using the password card and the decrypted password hint, the user password and displaying the user password on the user device.

* * * * *